Nov. 26, 1940.  R. C. NEWHOUSE  2,223,224
RADIO SPEED AND DRIFT INDICATOR
Filed June 24, 1938   3 Sheets-Sheet 1
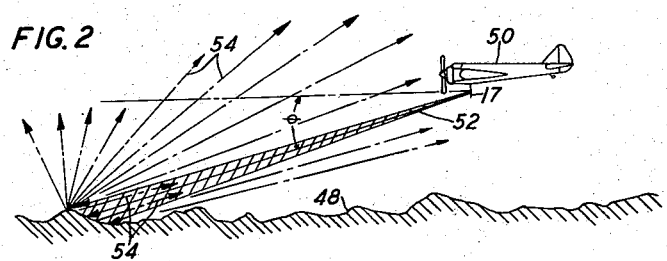
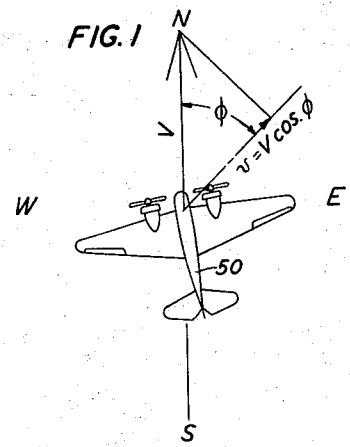
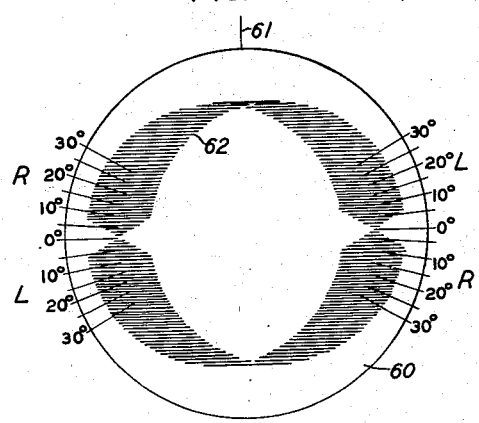
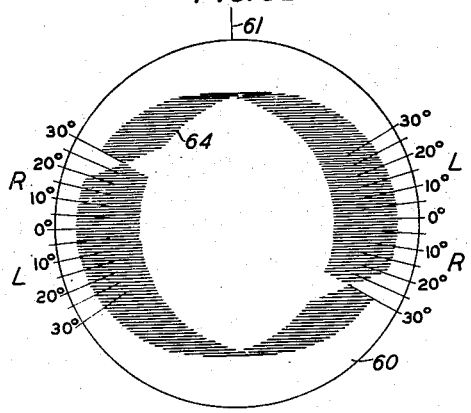
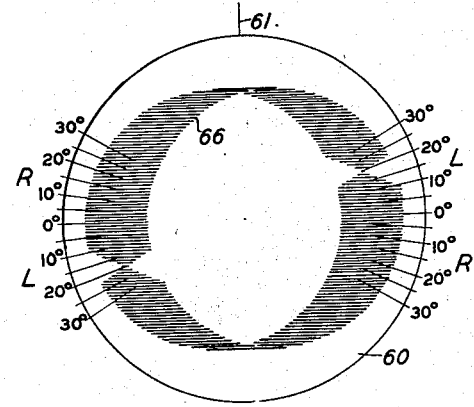
INVENTOR
R. C. NEWHOUSE
BY
H. O. Wright
ATTORNEY

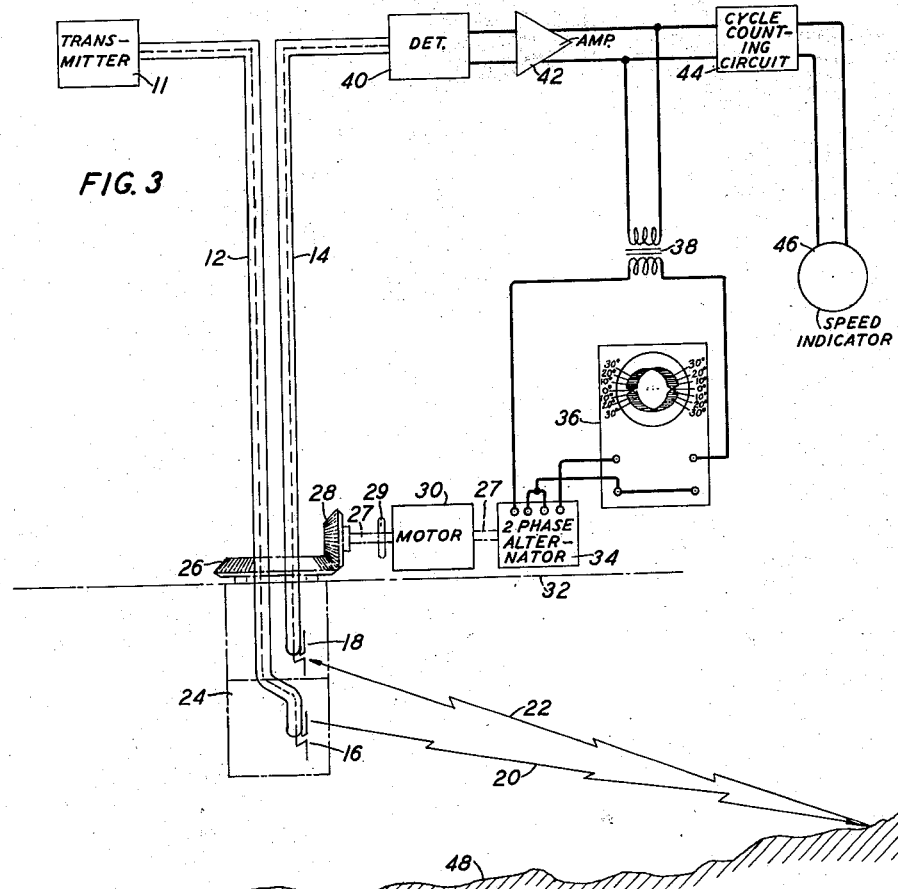
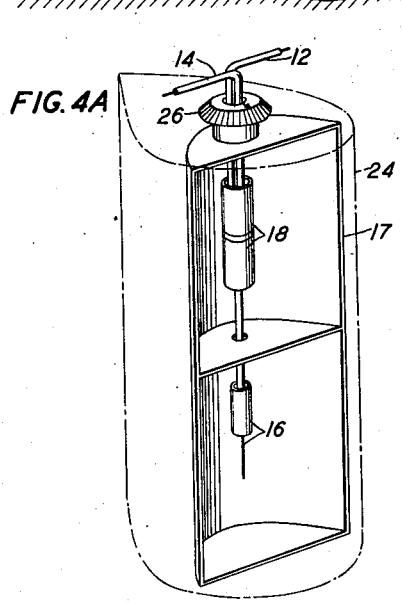
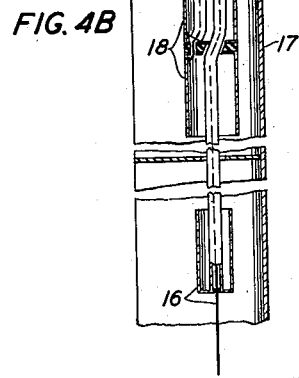

Nov. 26, 1940.   R. C. NEWHOUSE   2,223,224
RADIO SPEED AND DRIFT INDICATOR
Filed June 24, 1939   3 Sheets-Sheet 3

INVENTOR
R. C. NEWHOUSE
BY
H. O. Wright
ATTORNEY

Patented Nov. 26, 1940

2,223,224

UNITED STATES PATENT OFFICE 2,223,224

RADIO SPEED AND DRIFT INDICATOR

Russell C. Newhouse, Orange, N. J., assignor to Bell Telephone Laboratories, Incorporated, New York, N. Y., a corporation of New York Application June 24, 1939, Serial No. 280,920

11 Claims. (Cl. 250—2)

This invention relates to improved methods of obtaining speed and drift indications on mobile objects and to improved apparatus and systems for employing the methods. More particularly it relates to methods comprising radiating energy waves from a mobile object, receiving on the object reflections from the adjacent surface and comparing the reflected waves with the emitted waves to obtain indications of the speed and drift of said object with relation to the adjacent surface and to apparatus and systems for practicing said methods.

It is an object of this invention to provide means for determining on a mobile object its actual speed relative to an adjacent surface.

Another object is to provide means for determining on a mobile object its drift and its actual direction of motion relative to an adjacent surface.

A further object of this invention is to provide means for indicating directly and continuously the actual ground speed and drift of aircraft in flight.

Other and further objects of the invention will become apparent during the course of the following description and in the appended claims.

This invention is directed particularly toward the solution of the problems, frequently encountered in the navigation of aircraft, of determining the absolute speed and actual direction of motion relative to the earth's surface of an aircraft proceeding in a substantially horizontal plane. In a cross wind the actual direction of motion is frequently quite different from the heading of the craft. Likewise the speed of the craft relative to the surrounding atmosphere may be very different from its speed relative to the earth's surface, head winds reducing and tail winds increasing the latter.

The principles of the invention will be more readily understood in connection with the following description and the accompanying drawings in which:

Fig. 1 represents the velocity component in the plane of motion of an aircraft in flight at any angle $\phi$ with respect to the actual direction of motion of the craft;

Fig. 2 represents an aircraft proceeding in a horizontal plane and radiating energy waves toward the surface of the earth at an angle of $\theta$ with respect to horizontal;

Fig. 3 represents diagrammatically a system embodying the principles of this invention for providing direct and continuous indications of the actual speed and drift of an aircraft relative to the surface of the earth;

Figs. 4A and 4B show the mechanical details of an arrangement of antennas suitable for use in the system of Fig. 3;

Figs. 5A, 5B and 5C show typical cathode ray drift indicator patterns for zero drift, right drift and left drift, respectively;

Figure 6:
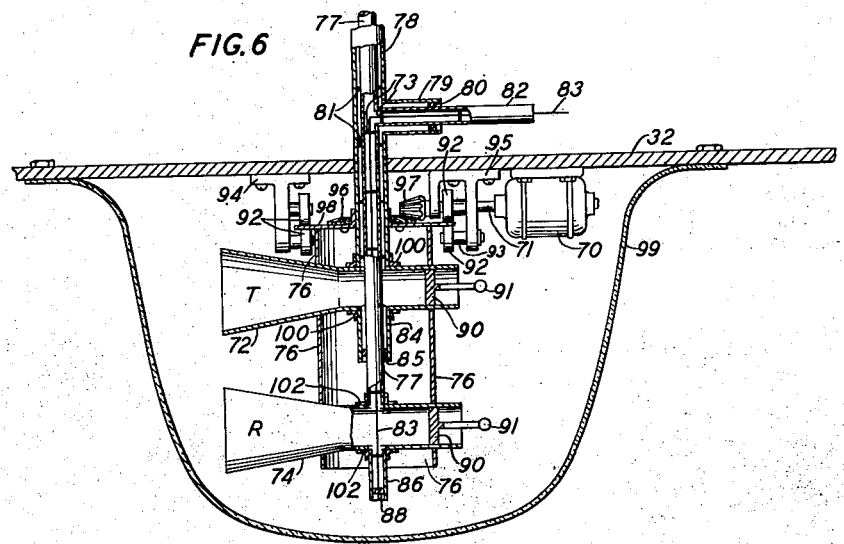
Figure 7A:
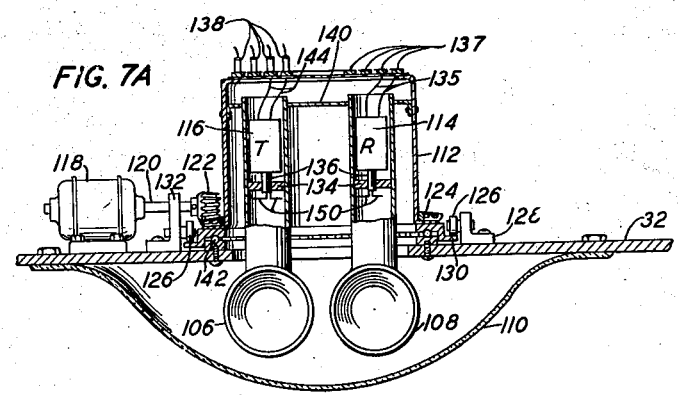
Figure 7B:
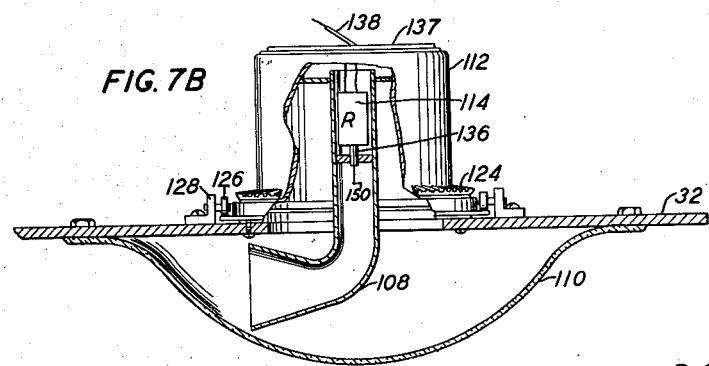

Fig. 6 shows a pair of rotatable wave guides suitably arranged for use in systems of this invention as a radiator and a receptor, respectively, of ultra-high frequency energy; and Figs. 7A and 7B show an alternative arrangement of a pair of wave guides in which only the orifices of the guides need project beyond the surface of the craft and in which the transmitter and receiver are housed in extensions of their respective associated wave guides.

In more detail, Fig. 1 illustrates an aircraft 50 cruising in a due northerly direction with a velocity V. The component of this velocity in any other direction is given by the equation $$v = V \cos \phi \tag{1}$$

where $\phi$ is the angle between the other direction chosen and the actual course of the craft. Assuming the craft to be flying in a horizontal plane and projecting an energy beam or wave at an angle $\theta$ below the horizontal, as illustrated in Fig. 2, and assuming also that the wave-length of the energy beam is small in comparison with the average irregularities of the surface of the earth, the phenomena designated "diffuse reflection" will occur at the earth's surface and a portion of the energy beam or wave will return in the direction of the aircraft.

When the energy beam is projected in any particular vertical plane in which the velocity of the aircraft is $v$, the velocity of the aircraft relative to the energy beam is $$V_1 = v \cos \theta \tag{2}$$

For the simple case of a moving craft carrying a source emitting an energy wave, which wave is received at a fixed point, an effect, commonly known as the Doppler effect, takes place. If the frequency of the emitted energy wave be F and its velocity of propagation be C, its wave-length will be $$\lambda = \frac{C}{F} \tag{3}$$

If the emitting source were stationary, F cycles, or waves, would occupy a distance C in space but when the source moves at a velocity of $V_1$ in the direction of propagation, $F$ cycles, or waves, occupy a space $C-V_1$ in said direction so that the wave-length is in effect reduced and the apparent frequency of the wave as observed at a fixed point directly in advance of the moving source is greater than $F$ and its value $F_r$ may be determined from the following equation:

$$F_r = \frac{FC}{C-V_1} \quad (4)$$

Where, as in the situations contemplated in the present invention, the emitted wave is in part reflected from a fixed point back to the moving craft and is received thereon, the effect as to such reflected part is compounded and the apparent frequency of the reflected part as received on the moving craft is given by the following equation:

$$F_e = F_r \frac{C+V_1}{C} = F\frac{C+V_1}{C-V_1} \quad (5)$$

The frequency difference between this reflected wave and the emitted wave is, therefore:

$$f = F\frac{C+V_1}{C-V_1} - F = \frac{2FV_1}{C-V_1} \quad (6)$$

This frequency difference may be measured by the well-known expedient of beating the reflected waves with instantly transmitted energy and observing the frequency of the resulting beat note.

When radio waves are employed the velocity of propagation $C$ is so great (186,000 miles per second) that $V_1$ in the denominator of Equation 6 may be neglected and for all practical purposes, therefore, the following equation may be used:

$$f = \frac{2FV_1}{C} \quad (7)$$

When the emitted wave beam is arranged to be rotated about a vertical axis, as in the illustrative embodiment of this invention shown in Fig. 3, the value of $f$ for any beam direction is obtained by substituting for $V_1$ its value from Equations 1 and 2 which gives:

$$f = \frac{2FV}{C} \cos\theta \cos\phi \quad (8)$$

$\theta$ being the angle of transmission below horizontal as shown in Fig. 2 and $\phi$ being the angle between the direction of motion and the direction of transmission as shown in Fig. 1.

The instantaneous value of $F$ is zero twice during each rotation of the beam and also twice during each rotation of the beam the instantaneous value of $F$ reaches a maximum of $$2FV\frac{\cos\theta}{C}$$

The zero values occur in the directions bearing a quadrature relation to the actual direction of motion of the craft and the maximum values occur when the direction of the beam relative to the plane of motion coincides wtih the actual direction of motion of the craft.

The variable frequency $f$ obtainable by beating the received reflected components of the wave with energy derived from the instantly transmitted wave is obviously very similar to the beat note frequency obtained by the terrain clearance indicating system of my copending application, Serial No. 240,739, filed November 16, 1938, relating to a radiant energy distance measuring system. The average value of $f$ is directly proportional to the "ground speed" of the craft and is $$F(d) = \frac{1}{\pi}\int_{-\frac{\pi}{2}}^{+\frac{\pi}{2}} f d\phi = \frac{4FV}{\pi C}\cos\theta \quad (9)$$

In general $\theta$ should preferably not exceed 45 degrees and radiation should obviously be confined to as narrow a beam as is practicable to avoid a multiplicity of reflections from widely separated surfaces. Where sufficient power is available so that reflections of appropriate magnitude will still be received on the aircraft, the angle $\theta$ should preferably be made to approach as nearly to zero as possible since the effective "spread" of the transmitted beam on the reflecting surface will be reduced as the angle $\theta$ is reduced. Effective "spread," as here used, refers to the width of the frequency spectrum, for a given beam direction, generated by the Doppler effect. It should be noted that though the actual physical area covered by the beam increases as the angle $\theta$ is reduced the frequency spectrum generated decreases since the velocity of approach of the craft with respect to the extreme edges of the area becomes more nearly the same. A value of approximately 30 degrees for the angel $\theta$ will be found suitable for the majority of practical applications of the principles of the invention.

The higher the frequency employed the easier it will be to construct antenna systems having suitable directional characteristics and the smaller the irregularities required in the reflecting surface to provide satisfactory diffuse reflection will be. Also the higher the transmitted frequency the higher the average beatnote frequency $F(d)$ will be and the denser and consequently more distinct the drift indicating pattern of the cathode ray tube will be.

With a frequency in the neighborhood of 3000 megacycles, a speed of approximately 200 miles per hour and any ordinarily encountered, relatively smooth terrain, reasonably satisfactory indications may be obtained with a system such as that shown in Fig. 3. Over the more irregular types of surfaces such, for example, as the open sea, a system using energy having a much longer wave-length would be capable of providing the desired indications. This is particularly so if the character of the terrain is such that it presents substantial areas sensibly normal to the oblique beam of the system, in which case much of the energy reflected back to the aircraft may be the result of direct reflection rather than diffuse reflection. If this is so the use of a longer wave-length is to be preferred. In general, where diffuse reflection is utilized the wave wave-length should not exceed approximately eight times the average magnitude of the irregularities of the reflecting surface. The average magnitude of the irregularities of any particular surface may, of course, be estimated by physical measurements made on sample areas of the surface. The validity of estimates so made may obviously be checked by the empiric method, that is, by increasing the frequency of the emitted waves of a system of the invention from a value at which the indications obtained are not satisfactory until satisfactory indications are obtained. The power output of the transmitter should preferably be at least 5 watts and under unfavorable circumstances as much as 50 watts or more may be found desirable.

The illustrative system of Fig. 3 is comprised of the following component apparatus. A transmitter 11 connected by a transmission line 12 to a transmitting antenna 16. A receiving antenna 18 connected by transmission line 14 to a detector 40.

The transmitting and receiving antennas of Fig. 3 are simple vertical dipole antennas aligned on a common axis as shown in more detail in Fig. 4A. A reflector 17 having a parabolic horizontal cross-section, is aligned so that its focal line coincides with the common vertical axis of the antennas. This arrangement permits the antennas to remain stationary and produces and responds to waves with the electric vector vertically polarized.

The radiated beam is rotated by rotating the reflector, by means of bevel gears 26 and 28 which are driven by shaft 27 of motor 30. The beam should be rotated at a rate in the order of 1200 revolutions per minute or higher since such a rate would cause the cathode ray pattern to appear to be continuous.

A two-phase alternator is connected to the right end of shaft 27 and its voltage is employed to cause a cathode ray indicator 36 to trace a circular pattern in synchronism with the rotation of the radio beam. The alternator must generate one cycle per revolution of the antenna beam. A gear train of appropriate ratio may obviously be inserted between the motor and the alternator if necessary.

As antenna 18 is arranged to receive some energy directly from antenna 16, as well as the reflected wave, the output of deflector 40 will be a beat frequency the characteristics of which may be interpreted as explained above to give speed and drift indications.

This beat frequency is amplified in an amplifier 42 and a part of the output of amplifier 42 is supplied to a cycle counting circuit 44 which in turn furnishes the speed indicating meter 46 with a current proportional to the average frequency of the beat note. The cycle counting circuit is preferably of the type described in my above-mentioned copending application covering a radiant-energy distance measuring system. Alternatively the cycle counting circuit may be of the type illustrated by Fig. 5 of the drawings accompanying U. S. Patent 2,113,011, issued April 5, 1938, to E. L. C. White.

Amplifier 42 also supplies the beat frequency to a transformer 38 by which it is introduced into the horizontal deflecting plate circuit of cathode ray indicator 36. As explained above, for two beam positions no beat frequency will be obtained and consequently no deflection of the beam will take place and the position of these points on the circular trace will indicate the drift or angle between the heading of the craft and the actual direction of motion. Typical patterns are shown in Figs. 5A, 5B and 5C and as shown therein, the target of the cathode ray tube may be calibrated so that the drift may be read directly therefrom. The pattern of Fig. 5A indicates the condition of no drift or, in other words, it indicates that the heading of the craft and the direction of motion of the craft are the same. The pattern of Fig. 5B indicates a drift to the right of 30 degrees or, in other words, that the direction of motion of the craft is at an angle of 30 degrees to the right with respect to the heading of the craft. Similarly, the pattern of Fig. 5C indicates a drift to the left of 20 degrees.

Handwheel 29 is provided for pointing the antenna system manually. Obviously the beam positions at which no beat note is obtained may be determined when turning the antenna system manually and the positions for maximum frequency of beat note may also be determined.

For example, a maximum reading of meter 46 or a maximum density of the lateral deflection on the drift indicator would serve to denote maximum beat-note frequency and a zero reading on meter 46 or zero lateral deflection of the cathode ray indicator would serve to denote the absence of a beat note. Alternatively, the output of amplifier 42 could be monitored with headphones or a loud-speaker during manual rotation of the antenna system. The maximum beat-note frequency so obtained can obviously be employed to indicate actual ground speed by merely providing a suitable calibration on meter 46 for manual operation and the positions of the antenna system for which it obtains can be employed to indicate directly the actual direction of motion of the craft and should be in quadrature with the positions for zero beat note. Ordinarily, however, the positions for zero beat note will be more sharply defined and therefore preferable indices of direction of motion.

Figs. 4A and 4B show the mechanical details of one type of antenna system which may be employed with the system of Fig. 3. As mentioned above, vertical dipole antennas 16 and 18 are arranged with their common axis coincident with the focal line of parabolic reflector 17. These antennas produce vertically polarized waves (electric vector vertical) and the beam is rotated by rotating the reflector only.

Since the edges of all reflectors, horn radiators, and directive arrays, radiate some energy in directions other than that of the main beam, some signal reaches the receiving antenna directly from the transmitting system and is normally sufficient for correct operation of the system. The direct signal can be increased when necessary by providing a direct connection as, for example, through a coaxial conductor and attenuating network from the transmitter to the receiver detector or indirectly as for example by locating a small dipole or metallic plate ($\lambda/2$ or less in dimensions) in a position such that it receives a small amount of energy from the transmitting antenna and reradiates some of it to the receiving antenna.

A streamlined enclosure 24 is provided to free the antenna system from the drag of the air. Enclosure 24 should, obviously, freely transmit electromagnetic waves. Fig. 4B shows the method of terminating transmission lines 12 and 14 at their respective vertical dipole antennas.

The above antenna system is relatively simple mechanically and has to a fair degree the properties desirable in systems of this invention. While the antennas are arranged on a vertical axis, it is well known that dipole antennas radiate a substantial proportion of their energy at angles of 30 degrees or slightly more with respect to the normal to the antenna axis.

For very high frequencies, devices such as small antenna arrays, focusing lenses and reflectors and waves guides may be employed to provide sharply directed beams. This, as mentioned above, is desirable. For very high frequencies also it may be found desirable to in effect eliminate transmission lines 12 and 14 of Fig. 3 by placing the transmitter and detector tubes immediately adjacent to their respective antennas.

Figs. 6, 7A and 7B are illustrative of the numerous possible alternative arrangements of radiating and receiving devices suitable for use in systems of this invention.

In Fig. 6 a three-conductor concentric line system is employed comprising tubes 77 and 78 and central conductor 83. Energy from the transmitter is carried on the inner surface of tube 78 and the outer surface of tube 77 to transmitting wave guide 72. Tube 78 terminates at the upper surface of wave guide 72 in a close-fitting flange 100. Flange 100 is rigidly attached to wave guide 72 but is free to rotate on tube 78.

Tube 77 is continued through the throat of wave guide 72 to the upper surface of receiving wave guide 74 where it terminates in a close-fitting flange 102, flange 102 being rigidly attached to wave guide 74 but free to rotate on tube 77. The innermost conductor 83 extends through the throat of wave guide 74 and beyond the lower surface thereof.

Beneath each wave guide a tube and adjustable short-circuiting washer, 84 and 85 for guide 72 and 86 and 88 for guide 74, respectively, are provided to terminate the respective lower ends of conductors 77 and 83 in suitable impedances to enhance radiation and reception of energy, respectively, by the portions of these conductors located in the throats of guides 72 and 74. Flanges 100 and 102 on the upper and under surfaces of guides 72 and 74, respectively, permit the guides to be rotated and the conductors 77, 78 and 83 and tuning units including tubes 84 and 86 to retain stationary.

The effective throat lengths of guides 72 and 74 may be adjusted by sliding conducting discs 90 provided with handles 91 longitudinally in the guides.

The guides 72 and 74 are held in frame 76, the upper surface 98 of which is flanged and rests between rollers 92 which are free to turn on their respective shafts or axles. Bracket 94 serves, as shown, to support the axles upon which turn the two rollers 92 at the left in Fig. 6 and the bracket 95 serves, as shown, to support axle 93 upon which turns the lower roller 92 at the right in Fig. 6. This same bracket 95 also assists in supporting shaft 71 upon which the upper roller 92 at the right in Fig. 6 is arranged to turn freely. The upper surface 98 has also affixed thereto a bevel gear 96 which meshes with bevel gear 97. Motor 70 is arranged to turn bevel gear 97 through shaft 71 and thus effect the rotation of wave guides 72 and 74.

Energy received by wave guide 74 is conducted on the outer surface of conductor 83 and the inner surface of conductor 77 through the wall 32 of the aircraft whence it is led to the detector by conductors 82 and 83. Stub tube 79 and short-circuiting washer 80 provide a high impedance to prevent diversion of transmitting energy from guide 72.

Enclosure 99 is provided to free the guides from the drag of the air. It should preferably be streamlined to reduce its air resistance and must not interfere with the free transmission and reception of electromagnetic waves.

The arrangement of Fig. 6 provides the well-known directive properties of wave guides and permits the use of a system in which only the wave guides need be rotated.

Of course, if a cathode ray drift indicator of the type described in connection with Fig. 3 is to be employed, the shaft of motor 70 should also drive a two-phase alternator, or other means of synchronizing or coordinating the beam trace with the rotation of the radiating system should be provided.

In Figs. 7A and 7B a system similar in many respects to that of Fig. 6 is shown, except that the transmitter 116 and the receiver 114 are mounted in extensions of the throats of their respective wave guides 106 and 108 and the wave guides are shaped so that only their orifices need extend beneath the lower surface 32 of the craft. As shown, the system generates and responds to horizontally polarized waves (electric vector horizontal). Vertical polarization may evidently be obtained by simply rotating the dipole antennas 90 degrees in their respective planes normal to the longitudinal axes of the horns.

The arrangement of Figs. 7A and 7B necessitates the use of slip rings 137 and brushes 138 to provide power and output circuit connections to the transmitter and receiver, respectively, but reduces to a minimum the length of connections 136 between the dipole antennas 150 and the receiver and transmitter, respectively. Plungers 134 in the throats of the wave guides permit adjustment for efficient operation.

Housing 112 supports the wave guides and is flanged at its lower edge, the flange resting upon ball bearings 142 and being held in place by rollers 126 which are free to turn on their respective axles. Motor 118 is arranged to rotate the housing 112 through shaft 120 and beveled gears 122 and 124. Enclosure 110 freely passes electromagnetic waves but shields the projecting portions of the wave guides from the drag of the air. It should preferably be streamlined. Motor 118 may also drive a two-phase alternator if the system is to employ a cathode ray drift indicator of the type described in connection with Fig. 3.

The above arrangements are illustrative of the principles of the invention. Numerous other arrangements involving the principles of this invention will doubtless occur to those skilled in the art. The scope of the invention is defined in the following claims.

What is claimed is:

1. In a radio speed and drift indicating system for aircraft, means for projecting a radio beam toward the surface of the earth at an acute angle below the horizontal plane of the craft, means for rotating said beam about a vertical axis, means for receiving reflections of said beam from the surface of the earth, means for determining the difference between the frequency of the beam transmitted and the apparent frequency of the received reflections of said beam, means responsive to the average value of said frequency difference for indicating the actual speed of said craft and means responsive to the instantaneous values of said frequency difference for indicating the drift or actual direction of motion of said craft relative to the surface of the earth.

2. In a radio speed indicating system for aircraft, means for projecting a radio beam toward the surface of the earth at an acute angle below the horizontal plane of the craft, means for rotating said beam about a vertical axis, means for receiving reflections of said beam from the surface of the earth, means for determining the difference between the frequency of the beam transmitted and the apparent frequency of the received reflections of said beam, means comprising a cathode ray oscillograph, the ray of which is caused to trace a discrete path in synchronism with the rotation of said beam, for determining the positions of the beam for which said frequency difference is maximum, and means responsive to said maximum frequency difference for indicating the speed of said craft relative to the surface of the earth.

3. In a radio drift indicating system for aircraft, means for projecting a radio beam toward the surface of the earth at an acute angle below the horizontal plane of the craft, means for rotating said beam about a vertical axis, means for receiving reflections of said beam from the surface of the earth, means for determining the difference between the frequency of the beam transmitted and the apparent frequency of the received reflections of said beam, means for determining the positions of said beam for which said frequency difference is zero whereby an indication of the drift of said aircraft is obtained.

4. The method of determining the absolute speed of a moving object relative to an adjacent surface which comprises directively radiating from said object a beam of wave energy to strike said surface obliquely, continuously rotating said beam about an axis normal to the plane of motion of said object, receiving reflections of said beam on said object, directly receiving a small amount of the radiated energy waves, and determining the average frequency difference between the directly received waves and the received reflections.

5. The method of determining the absolute direction of motion of a moving object relative to an adjacent surface which comprises, directively radiating from said object a beam of wave energy to strike said surface obliquely, continuously rotating said beam about an axis normal to the plane of motion of said object, receiving reflections of said beam on said object, directly receiving a small amount of the radiated energy waves and determining the beam directions about said axis for which the apparent frequency of the received reflections coincides with the frequency of the directly received waves.

6. An absolute speed and drift indicating system for mobile craft comprising a generator of ultra-high frequency energy waves, a radiator of said waves having highly directive properties and energized by said generator, means for rotating the directive beam of said radiator about an axis normal to the plane of motion of said mobile craft and for maintaining said beam at an oblique angle with respect to said plane of motion such that the beam will strike the surface of the earth at a distance exceeding that of the shortest distance of the radiator from the earth, a receptor responsive to said waves arranged to receive directly a small amount of said radiated energy together with reflections thereof from the earth's surface, a detector connected to said receptor for producing a beat note representing the frequency difference between the said directly received and the received reflected components of said energy waves, an amplifier connected to the output of said detector, a cycle counting circuit and a speed indicating meter, said cycle counting circuit being supplied with energy of the beat-note frequency by said amplifier and furnishing said meter with a current the average value of which is proportional to the average frequency of the amplified beat-note frequency, a cathode ray indicator, means for causing the ray of said last-stated indicator to trace a circular path in synchronism with the rotation of the directive beam, and means for introducing in the circuit of the lateral deflecting plates of said cathode ray indicator a voltage derived from the amplified beat-note frequency whereby the angular direction of the points of zero frequency difference between the directly received and the reflected energy components will become apparent and the drift of the mobile craft will be indicated.

7. The method of determining the absolute direction of a mobile craft with respect to an adjacent surface which comprises radiating obliquely toward said surface a beam of wave energy of wave-length not exceeding eight times of the average irregularities of said surface, continuously rotating said energy beam about an axis normal to the plane of motion of said craft, directly receiving a small amount of energy from said beam, receiving reflections of said energy beam from said surface, combining said received reflected waves with the directly received energy to obtain a beat note and determining the directions of radiation for which the frequency of said beat note passes through zero.

8. The method of indicating the absolute speed of an aircraft with respect to an adjacent surface which comprises producing on said craft a radio frequency electromagnetic wave of wavelength less than eight times the magnitude of the average irregularities of the adjacent surface, directively radiating said wave obliquely toward the adjacent surface continuously rotating the direction of radiation of said wave about an axis normal to the horizontal plane of said craft, directly receiving a portion of the radiated energy on said craft, receiving reflections of said wave on said craft, producing a current on said craft having the beat frequency between the directly received and received reflected portions of said wave, determining the average value of said beat frequency and utilizing the average value of said beat frequency to indicate the absolute speed of said craft relative to the adjacent surface.

9. In a drift indicator for aircraft, means on said craft for transmitting an energy beam to impinge obliquely upon the surface of the earth, means for rotating said beam about an axis normal to the horizontal plane of said craft, means on said craft for receiving reflections of said beam together with a small amount of directly radiated energy of said beam, a cathode ray indicator on said craft, means for causing the ray of said indicator to traverse a circular path in synchronism with the rotation of said beams and means for deflecting said ray from said circular path responsive to a frequency difference existing between said received reflected energy and the said directly received energy.

10. A speed and drift indicator for aircraft comprising the system of claim 9 and means for indicating the average value of the frequency differences between the said two energies.

11. The system of claim 9, the target of the cathode ray indicator of said system being calibrated so that the angle of drift may be read directly upon observing the position of the points of zero deflection of said ray from its circular path.

RUSSELL C. NEWHOUSE.